United States Patent
Kim et al.

(10) Patent No.: US 9,069,673 B2
(45) Date of Patent: Jun. 30, 2015

(54) MEMORY SYSTEM CONFIGURED TO PERFORM SEGMENT CLEANING AND RELATED METHOD OF OPERATION

(71) Applicant: SAMSUNG ELECTRONICS CO., LTD., Suwon-Si, Gyeonggi-Do (KR)

(72) Inventors: Jae-Geuk Kim, Hwaseong-Si (KR); Chang-Man Lee, Seoul (KR); Chul Lee, Hwaseong-Si (KR); Joo-Young Hwang, Suwon-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/038,917

(22) Filed: Sep. 27, 2013

(65) Prior Publication Data
US 2014/0095803 A1    Apr. 3, 2014

(30) Foreign Application Priority Data
Sep. 28, 2012    (KR) .......................... 10-2012-0109372

(51) Int. Cl.
G06F 12/00    (2006.01)
G06F 13/00    (2006.01)
G06F 13/28    (2006.01)
G06F 12/08    (2006.01)

(52) U.S. Cl.
CPC ........ G06F 12/0815 (2013.01); G06F 12/0804 (2013.01); G06F 12/0871 (2013.01)

(58) Field of Classification Search
CPC ............ G06F 12/0815; G06F 12/0804; G06F 12/0871

USPC .......................................................... 711/143
See application file for complete search history.

(56) References Cited

U.S. PATENT DOCUMENTS

| | | | |
|---|---|---|---|
| 5,551,003 A * | 8/1996 | Mattson et al. ................ | 711/136 |
| 6,535,949 B1 | 3/2003 | Parker | |
| 6,611,852 B1 * | 8/2003 | Morley et al. .......................... | 1/1 |
| 6,715,027 B2 | 3/2004 | Kim et al. | |
| 7,062,675 B1 * | 6/2006 | Kemeny et al. .................. | 714/15 |
| 7,694,191 B1 * | 4/2010 | Bono et al. ....................... | 714/48 |
| 7,890,550 B2 | 2/2011 | Jung et al. | |
| 7,945,752 B1 * | 5/2011 | Miller et al. ................... | 711/162 |
| 8,135,677 B2 | 3/2012 | Matsuzawa et al. | |
| 8,156,290 B1 * | 4/2012 | Vanninen et al. ............. | 711/154 |
| 8,285,918 B2 * | 10/2012 | Maheshwari ................. | 711/103 |
| 2006/0149902 A1 | 7/2006 | Yun et al. | |
| 2009/0177857 A1 * | 7/2009 | Butterworth et al. ......... | 711/162 |
| 2011/0035548 A1 * | 2/2011 | Kimmel et al. ............... | 711/114 |
| 2011/0131231 A1 | 6/2011 | Hans et al. | |

FOREIGN PATENT DOCUMENTS

| | | |
|---|---|---|
| KR | 10-1067018 | 9/2011 |
| KR | 2011-0098279 A | 9/2011 |

* cited by examiner

*Primary Examiner* — Eric Oberly
(74) *Attorney, Agent, or Firm* — Volentine & Whitt, PLLC

(57) ABSTRACT

A host configured to interact with a storage device includes a write-back (WB) cache configured to write data to the storage device, a cache managing module configured to manage the WB cache, and a file system module configured to determine whether live blocks in victim segments among a plurality of segments stored in the storage device are stored in the WB cache, to read the live blocks from the storage device as a consequence of determining that the live blocks are not stored in the WB cache, to load the read live blocks to the WB cache, and to request the cache managing module to set dirty flags for the stored live blocks.

20 Claims, 12 Drawing Sheets

| NODE ID | PHYSICAL ADDRESS |
|---------|------------------|
| N0 | a |
| N1 | b |
| N2 | c |
| ⋮ | ⋮ |

MEMORY SYSTEM CONFIGURED TO PERFORM SEGMENT CLEANING AND RELATED METHOD OF OPERATION

CROSS-REFERENCE TO RELATED APPLICATIONS

This application claims priority under 35 U.S.C. §119 to Korean Patent Application No. 10-2012-0109372 filed on Sep. 28, 2012, the subject matter of which is hereby incorporated by reference.

BACKGROUND OF THE INVENTION

The inventive concept relates generally to memory technologies. More particularly, certain embodiments of the inventive concept relate to memory systems and methods in which segment cleaning is performed in the context of a log-structured file system.

A log-structured file system is commonly used in server storage systems comprising hard disk drives (HDDs). Because HDDs use a rotary motor, they have seek latency and rotational latency. Therefore, the log-structured file system may configure an entire disk as one log and perform sequential write operations only. For instance, when modifying a file, the log-structured file system may not modify data at an original position. Instead, it may add modified data at the end of the one log, so the log is continuously extended in one direction.

Where a log cannot be extended any further, segment cleaning may be performed to return invalid data in the log to a free area in which data can be stored. The invalid data is data that is no longer valid because it has been deleted or updated. The segment cleaning requires frequent read operations on victim segments that should be moved. These frequent read operations, however, increase system overhead.

SUMMARY OF THE INVENTION

In one embodiment of the inventive concept, a host configured to interact with a storage device comprises a write-back (WB) cache configured to write data to the storage device, a cache managing module configured to manage the WB cache, and a file system module configured to determine whether live blocks in victim segments among a plurality of segments stored in the storage device are stored in the WB cache, to read the live blocks from the storage device as a consequence of determining that the live blocks are not stored in the WB cache, to load the read live blocks to the WB cache, and to request the cache managing module to set dirty flags for the stored live blocks.

In another embodiment of the inventive concept, a segment cleaning method comprises determining whether live blocks in victim segments among a plurality of segments stored in a storage device are stored in a WB cache, as a consequence of determining that the live blocks are not stored in the WB cache, reading the live blocks from the storage device and storing the read live blocks to the WB cache, and requesting a module to manage the WB cache to set dirty flags for the stored live blocks in the WB cache.

In still another embodiment of the inventive concept, a segment cleaning method comprises, by operation of a log-structured file system, determining whether live blocks in victim segments among a plurality of segments in a storage device are stored in a WB cache, selectively reading the live blocks from the storage device and storing the read live blocks in the WB cache based on whether the live blocks are stored in the WB cache, and setting dirty flags for read live blocks that are stored in the WB cache responsive to the selectively reading.

These and other embodiments of the inventive concept can potentially reduce read overhead in a segment cleaning process, thus saving input/output (I/O) bandwidth.

BRIEF DESCRIPTION OF THE DRAWINGS

The drawings illustrate selected embodiments of the inventive concept. In the drawings, like reference numbers indicate like features.

DETAILED DESCRIPTION

Embodiments of the inventive concept are described below with reference to the accompanying drawings. These embodiments are presented as teaching examples and should not be construed to limit the scope of the inventive concept.

Unless defined otherwise, all technical and scientific terms used herein have the same meaning as commonly understood by one of ordinary skill in the art. The use of any and all examples or terms provided herein is intended merely to better illuminate the inventive concept and is not a limitation on the scope of the inventive concept unless otherwise specified. Unless defined otherwise, all terms defined in generally used dictionaries are not to be interpreted in an overly formal manner.

Figure 1:
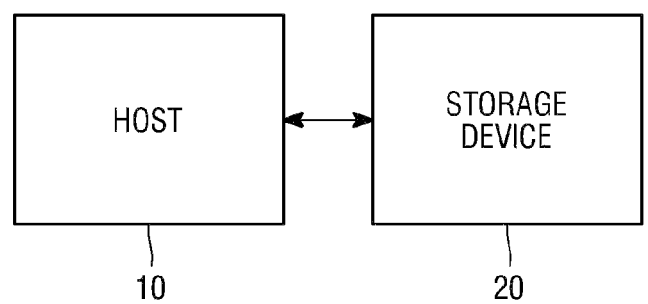
FIG. 1 is a block diagram of a computing system according to an embodiment of the inventive concept.

FIG. 1 is a block diagram of a computing system according to an embodiment of the inventive concept.

Referring to FIG. 1, a computing system 1 comprises a host 10 and a storage device 20. Host 10 and storage device 20 exchange data with each other using a predetermined protocol. For example, host 10 and storage device 20 may communicate with each other using at least one of various standard interface protocols such as, e.g., a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol.

Host 10 controls certain operations of storage device 20. For example, host 10 may write data to storage device 20 or read data from storage device 20. Storage device 20 may be, e.g., a card storage device (e.g., a solid state disk (SSD), an HDD, or an eMMC) or a data server.

Figure 2:
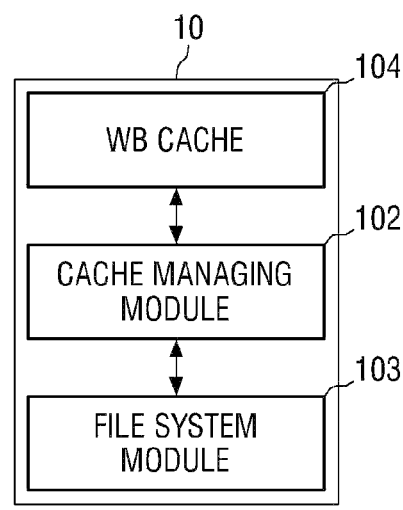
FIG. 2 is a block diagram of a host shown in FIG. 1 according to an embodiment of the inventive concept.

FIG. 2 is a block diagram of host 10 shown in FIG. 1 according to an embodiment of the inventive concept.

Referring to FIG. 2, host 10 comprises a WB cache 104 used to write data to storage device 20, a cache managing module 102 managing WB cache 104, and a file system module 103.

Each component shown in FIG. 2 can be, for instance, a software component or a hardware component. Examples of the hardware components include a Field Programmable Gate Array (FPGA) or an Application Specific Integrated Circuit (ASIC). Each component may be configured to reside on the addressable storage medium and configured to execute on one or more processors. The functionality provided for in the components may be further separated into additional components or may be combined into fewer components. In other words, the mapping between functions and components can be arbitrary.

File system module 103 selects victim segments from a plurality of segments stored in storage device 20. The victim segments are segments to be returned to a free area of storage device 20. Each of the victim segments comprises not only live blocks that are valid data but also invalid blocks that are no longer valid data because they have been deleted, updated, or the like. The live blocks in the victim segments may be reconstructed into a new clean segment, and the clean segment may be written back to storage device 20.

File system module 103 selects a segment comprising less than a predetermined proportion of live blocks or less than a predetermined number of live blocks as a victim segment. In general, however, the inventive concept is not limited to this method of selecting a victim segment.

File system module 103 identifies live blocks in each of the selected victim segments, and it determines whether each block in each of the victim segments is invalid by referring to metadata stored in storage device 20. Examples of the metadata are described in further detail below. File system module 103 obtains a file identifier (ID) of a file to which each of the discovered live blocks belongs and a block offset indicating a position of the live block in the file from the metadata stored in storage device 20. File system module 103 determines whether the live blocks are stored, or loaded, in WB cache 104 by using the file IDs and the block offsets of the live blocks. Where the live blocks are not stored in WB cache 104, file system module 103 reads the live blocks from storage device 20 and loads the live blocks to WB cache 104.

File system module 103 does not always read the live blocks in a segment cleaning process. Instead, file system module 103 reads the live blocks only where the live blocks are not stored in WB cache 104 and loads the live blocks to WB cache 104. Therefore, read overhead is reduced in the segment cleaning process, thus saving I/O bandwidth.

File system module 103 requests cache managing module 102 to set dirty flags for the live blocks, so that cache managing module 102 writes back the live blocks stored in WB cache 104 to storage device 20 through file system module 103 by flushing the live blocks to storage device 20. That is, cache managing module 102 controls file system module 103 such that a clean segment comprising one or more live blocks stored in WB cache 104 is written back to storage device 20.

The writing back of the clean segment is performed at a time when WB cache 104 flushes data set with dirty flags to storage device 20. Therefore, the time when the clean segment including the live blocks is stored again in storage device 20 may be different from the time when the live blocks are stored to WB cache 104. If the segment cleaning process is of a background type which is performed periodically, the live blocks are not highly likely to be read immediately. Therefore, the above time gap may be acceptable. However, if the segment cleaning process is of an on-demand type which is performed due to a lack of space in the free area of storage device 20, the victim segments need to be immediately returned to the free area. Therefore, file system module 103 may request cache managing module 102 to immediately write back the clean segment to storage device 20.

As indicated by the foregoing, the victim segments should be returned to the free area. Therefore, after the writing back of the clean segment, file system module 103 may designate the victim segments as the free area.

Figure 3:
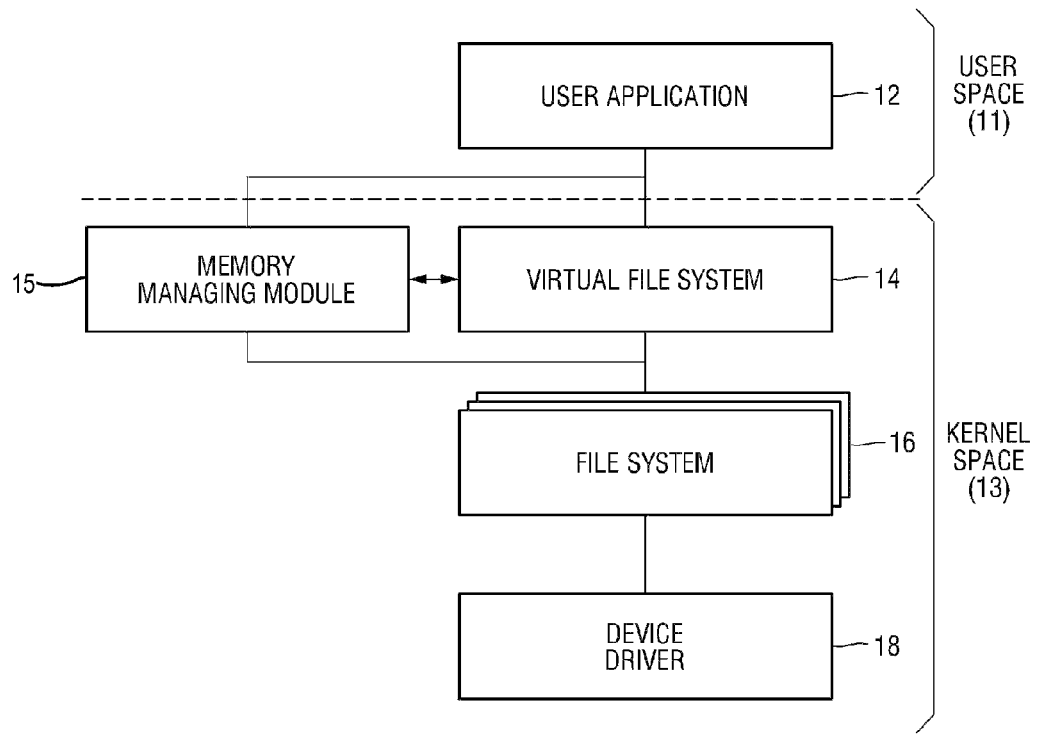
FIG. 3 is a diagram of modules in the host of FIG. 2 according to an embodiment of the inventive concept.

FIG. 3 is diagram illustrating examples of modules in host 10 according to an embodiment of the inventive concept.

Referring to FIG. 3, host 10 comprises a user space 11 and a kernel space 13. User space 11 is an area in which a user application 12 is executed, and kernel space 13 is an area dedicated to execution of a kernel. User space 11 may access kernel space 13 using a system call provided by the kernel.

Kernel space 13 comprises a virtual file system 14 which connects an I/O call of user space 11 to an appropriate file system 16, a memory managing module 15 which manages a memory of host 10, one or more file systems 16, and a device driver 18 which provides a hardware control call for controlling storage device 20. Examples of file systems 16 include ext2, ntfs, smbfs, and proc. One of file systems 16 may be an F2FS file system based on a log-structured file system. The F2FS file system will be described later with reference to FIGS. 4 through 9B.

Virtual file system 14 enables file systems 16 to operate with each other. For a read/write operation on different file systems 16 of different media, virtual file system 14 enables the use of a standardized system call. For example, a system call, such as open( ), read( ) or write( ), can be used regardless of the type of file systems 16. That is, virtual file system 14 is a virtual layer existing between user space 11 and file systems 16.

Device driver 18 serves as an interface between hardware and a user application (or operating system). Device driver 18 is a program needed for hardware to operate normally on a certain operating system.

File system module 103 shown in FIG. 2 operates as the above-described F2FS file system. In addition, cache managing module 102 shown in FIG. 2 may be a sub module in virtual file system 14 or memory managing module 15 shown in FIG. 3.

Figure 4:
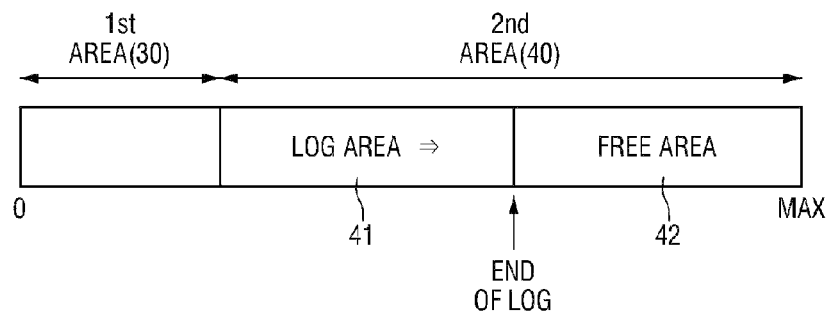
FIG. 4 is a diagram of a storage area of a storage device shown in FIG. 1 according to an embodiment of the inventive concept.

FIG. 4 is a diagram of a storage area of a storage device shown in FIG. 1 according to an embodiment of the inventive concept. FIGS. 4 through 9B illustrate the manner in which the F2FS file system controls storage device 20.

Referring to FIG. 4, a storage area of a storage medium of storage device 20 comprises a first area 30 and a second area 40. First area 30 is an area that is written in a random access manner, and second area 40 is an area that is written in a sequential access manner. A write operation in a sequential access manner refers to writing data to adjacent addresses which increase gradually, and a write operation in a random access manner refers to writing data to designated addresses regardless of whether the addresses are adjacent.

The F2FS file system divides storage device 20 into first area 30 and second area 40 when formatting storage device 20. However, the inventive concept is not limited thereto. In general, first area 30 is an area in which various forms of system information is stored. The information may comprise, for instance, the number of currently allocated files, the number of valid pages, positions, etc. Second area 40 is a space in which various directory information, data, and file information actually used by a user are stored.

Storage device 20 comprises a buffer utilized for random access. For optimum utilization of the buffer, first area 30 may be stored in a front part of storage device 20, and second area 40 may be stored in a rear part of storage device 20. Here, the front part precedes the rear part in terms of physical address.

Where storage device 20 is, for example, an SSD, a buffer may be included in the SSD. The buffer may be, for example, a single layer cell (SLC) memory that can be read or written at high speed. Therefore, the buffer can increase the speed of a random access write operation in a limited space. Hence, by placing first area 30 in the front part of storage device 20, a reduction in the I/O speed of storage device 20 due to random access can be prevented using the buffer.

Second area 40 comprises a log area 41 and a free area 42. In the example of FIG. 4, log area 41 is one connected area. However, as victim segments in log area 41 are changed to free area 42 in a segment cleaning process, log area 41 may become an unconnected area.

Log area 41 is a data-written area, and free area 42 is a data-writable area. Because second area 40 is written in a sequential access manner, data can be written only to free area 42 located at the end of log area 41.

Where data stored in log area 41 is modified, the modified data is written not to the position of the stored data in log area 41 but to free area 42 located at the end of log area 41. Here, the stored data becomes invalid.

As data is newly written or as stored data is modified, the end of log area 41 is gradually moved closer to the end of second area 40, thereby reducing free area 42. Here, segment cleaning is performed. A segment cleaning method according to the certain embodiments of the inventive concept will be described in detail later.

Figure 5:
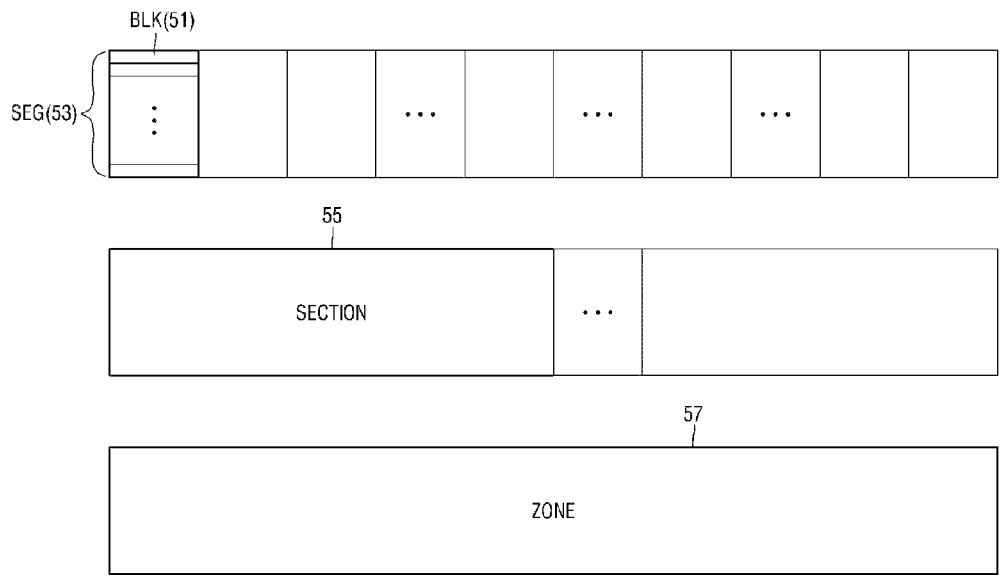
FIG. 5 is a diagram illustrating data stored in the storage device of FIG. 1 according to an embodiment of the inventive concept.

FIG. 5 is a diagram illustrating the configuration of data stored in storage device 20.

Referring to FIG. 5, a segment 53 comprises a plurality of blocks 51, a section 55 comprises a plurality of segments 53, and a zone 57 comprises a plurality of sections 55. For example, a block 51 may be 4 Kbytes, and a segment 53 including 512 blocks 51 may be 2 Mbytes. This configuration may be determined at a time when storage device 20 is formatted. However, the inventive concept is not limited thereto. The size of each section 55 and the size of each zone 57 can be modified when storage device 20 is formatted. The F2FS file system may read or write all data on a 4 Kbyte page-by-4 Kbyte page basis. That is, one page may be stored in each block 51, and a plurality of pages may be stored in each segment 53.

Figure 6:
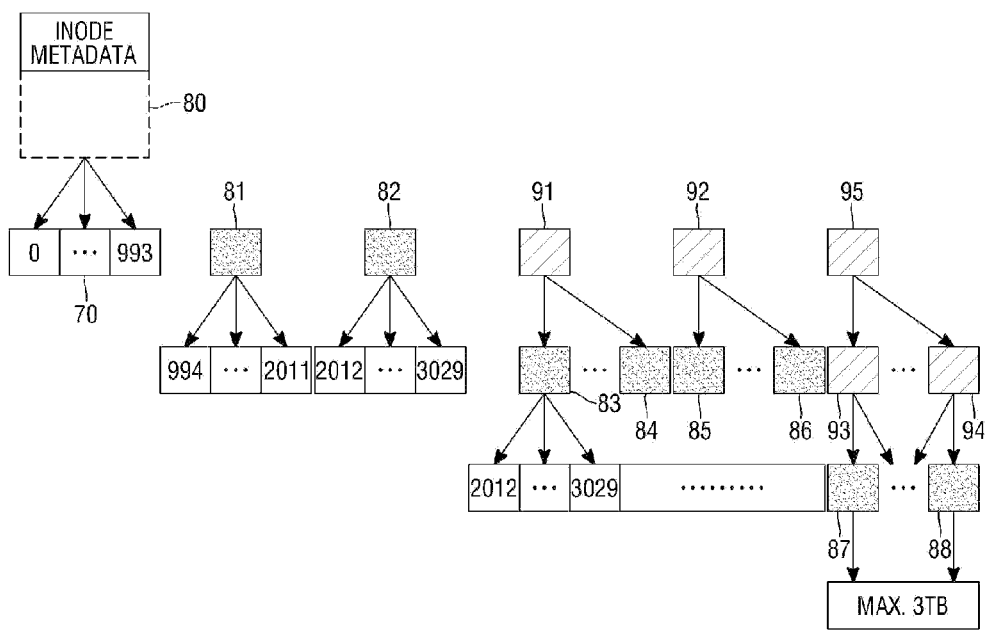
FIG. 6 shows an indexing structure for a file stored in storage device according to an embodiment of the inventive concept.

FIG. 6 shows an indexing structure for a file stored in storage device 20 according to an embodiment of the inventive concept.

Referring to FIG. 6, one file comprises a plurality of data and a plurality of nodes associated with the data. Data blocks 70 are where data is stored, and node blocks 80, 81 through 88 and 91 through 95 are where nodes are stored.

Node blocks 80, 81 through 88 and 91 through 95 comprises direct node blocks 81 through 88, indirect node blocks 91 through 95, and an Mode block 80. In the F2FS file system, one file has one Mode block 80.

Each of direct node blocks 81 through 88 includes an ID of Mode block 80 and a number of data pointers (which directly indicate data blocks 70) equal to the number of data blocks 70 which are child blocks of the direct node block. Each of direct node blocks 81 through 88 further stores information about where each data block 70 comes in the file corresponding to Mode block 80, that is, offset information of each data block 70.

Each of indirect node blocks 91 through 95 comprises pointers indicating direct node blocks or other indirect node blocks. Indirect node blocks 91 through 95 may include, for example, first indirect node blocks 91 through 94 and a second indirect node block 95. First indirect node blocks 91 through 94 comprise first node pointers which indicate direct node blocks 83 through 88. Second indirect node block 95 comprises second node pointers indicating first indirect node blocks 93 and 94.

Inode block 80 comprises at least one of data pointers, first node pointers indicating direct node blocks 81 and 82, second node pointers indicating first indirect node blocks 91 and 92, and a third node pointer indicating second indirect node block 95. One file has a maximum of 3 terabytes, and such a high-volume file may have the following indexing structure. For example, Mode block 80 may have 994 data pointers, and the 994 data pointers may indicate 994 data blocks 70, respectively. In addition, Mode block 80 may have two first node pointers, and the two first node pointers may indicate the two direct node blocks 81 and 82, respectively. Inode block 80 may have two second node pointers, and the two second node pointers may indicate the two first indirect node blocks 91 and 92, respectively. Inode bock 80 may have one third node pointer, and the third node pointer may indicate the second indirect node block 95.

FIGS. 7A through 7D illustrate in detail the storage area of storage device 20 configured by the F2FS file system according to some embodiments of the inventive concept.

Figure 7A:
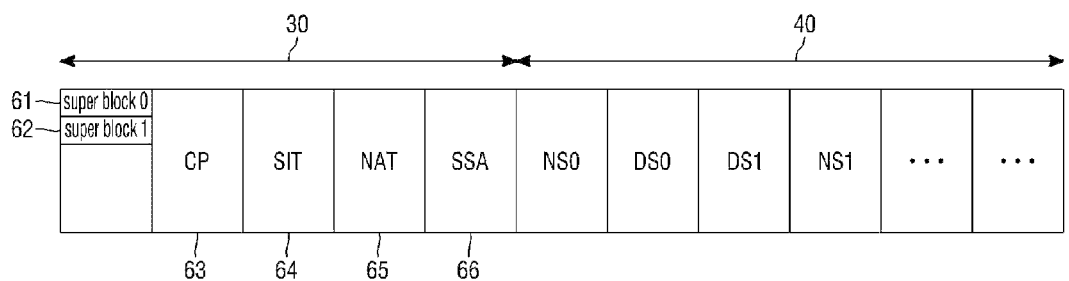
FIG. 7A is a diagram illustrating blocks stored in the storage device of FIG. 1 according to an embodiment of the inventive concept.

Referring to FIG. 7A, the F2FS file system may configure the storage area of storage device 20 to include a random accessible first area 30 and a sequentially accessible second area 40. Specifically, first area 30 comprises super blocks 61 and 62, a checkpoint (CP) area 63, a segment information table (SIT) 64, a node address table (NAT) 65, and a segment summary area (SSA) 66.

In super blocks 61 and 62, default information of a file system 16 is stored. For example, the size of blocks 51, the number of blocks 51, and a status plug (clean, stable, active, logging, or unknown) of file system 16 may be stored. As shown in the drawing, two super blocks 61 and 62 may be provided, and the same content may be stored in the two super blocks 61 and 62. Therefore, when a problem occurs in any of the two super blocks 61 and 62, the other can be used.

CP area 63 stores a checkpoint. The CP is a logical break point, and the status until the break point is completely preserved. When an accident (e.g., a shutdown) occurs during the operation of a computing system, file system 16 can recover data using the preserved CP. The CP may be generated periodically, at an Umount time, or at a system shutdown time. However, the inventive concept is not limited thereto.

Figure 7B:
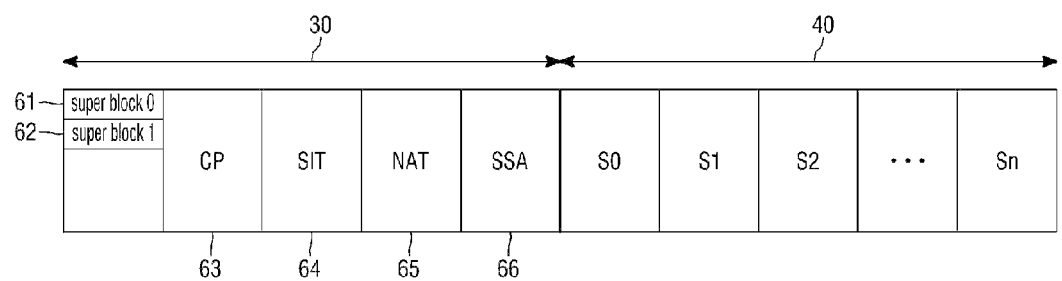
FIG. 7B is another diagram illustrating blocks stored in the storage device of FIG. 1 according to an embodiment of the inventive concept.
Figure 7C:
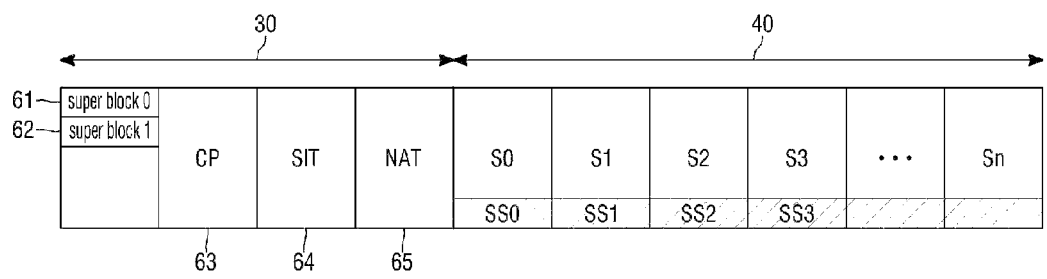
FIG. 7C is another diagram illustrating blocks stored in the storage device of FIG. 1 according to an embodiment of the inventive concept.
Figures 7D, 8:
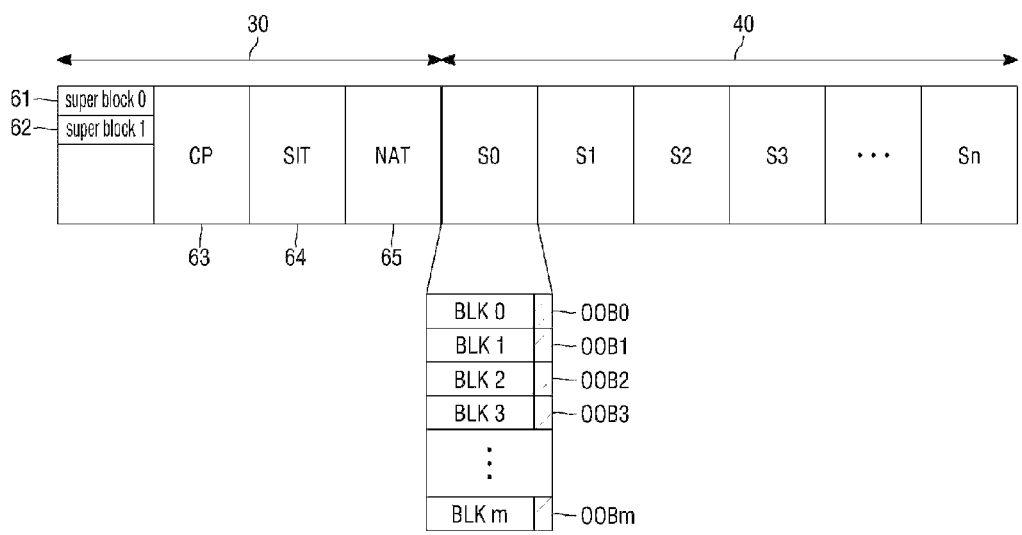
FIG. 7D is another diagram illustrating blocks stored in the storage device of FIG. 1 according to an embodiment of the inventive concept.
FIG. 8 is a diagram illustrating a node address table (NAT) according to an embodiment of the inventive concept.

As illustrated in FIG. 8, NAT 65 comprises a plurality of node IDs respectively corresponding to nodes and a plurality of physical addresses respectively corresponding to the node IDs. For example, a node block corresponding to node ID N0 may correspond to physical address a, a node block corresponding to node ID N1 may correspond to physical address b, and a node block corresponding to node ID N2 may correspond to physical address c. All nodes (an Mode, direct nodes, indirect nodes, etc.) have unique node IDs. In other words, all nodes (an Mode, direct nodes, indirect nodes, etc.) may be allocated unique node IDs from NAT 65. NAT 65 may store a node ID of an Mode, node IDs of direct nodes, node IDs of indirect nodes, and the like. A physical address corresponding to each node ID can be updated.

SIT 64 includes the number of live blocks in each segment and a bitmap indicating whether each block is a live block. Each bit of the bitmap indicates whether a corresponding block is a live block. SIT 64 can be used in a segment cleaning operation. That is, file system module 103 can identify live blocks in each victim segment by referring to the bitmap in SIT 64.

SSA 66 describes an ID of a parent node to which each block in each segment of second area 40 belongs.

Each of direct node blocks 81 through 88 has address information of data blocks 70 in order to access data blocks 70 which are its child blocks. On the other hand, each of indirect node blocks 91 through 95 has an ID list of its child nodes in order to access the child node blocks. Once an ID of a certain node block is identified, a physical address thereof can be identified with reference to NAT 65.

In a log-structured file system, data written to a data block is not overwritten at its original storage position as a different value. Instead, a new data block having updated data is written at the end of a log. In this case, a parent node block of the data block should modify the existing address of the data block. Therefore, to overwrite a data block or write back the data block at the end of the log in a segment cleaning process, information about a parent node of the data block is required. However, it is difficult for each data block or each node block to identify information about its parent node. Therefore, the F2FS file system comprises SSA 66 which contains an index used by each data block or each node block to identify an ID of its parent node block. Based on SSA 66, the ID of the parent node block of each data block or each node block can be identified easily.

One segment summary block has information about one segment in second area 40. In addition, the segment summary block consists of a plurality of pieces of summary information, and one piece of summary information corresponds to one data block or one node block.

Referring again to FIG. 7A, second area 40 comprises data segments DS0 and DS1 and node segments NS0 and NS1 separate from data segments DS0 and DS1. A plurality of data may be stored in data segments DS0 and DS1, and a plurality of nodes may be stored in node segments NS0 and NS1. If data and nodes are stored in different regions, segments can be managed efficiently, and the data can be read more effectively in a shorter time.

In the drawing, first area 30 includes super blocks 61 and 62, CP area 63, SIT 64, NAT 65, and SSA 66 arranged sequentially. However, the inventive concept is not limited thereto. For example, the position of SIT 64 and the position of NAT 65 can be reversed, and the position of NAT 65 and the position of SSA 66 can be reversed.

The F2FS file system can also configure the storage area of storage device 20 as shown in FIG. 7B. As illustrated in FIG. 7B, in a storage device of a computing system according to another embodiment of the inventive concept, second area 40 comprises a plurality of segments S1 through Sn which are separate from each other, where n is a natural number. While data segments and node segments are managed separately in FIG. 7A, data and nodes can be stored together in each of segments S1 through Sn in FIG. 7B.

The F2FS file system can also configure the storage area of storage device 20 as shown in FIG. 7C. As illustrated in FIG. 7C, first area 30 does not include SSA 66 (see FIG. 7A). That is, first area 30 includes super blocks 61 and 62, CP area 62, SIT 64, and NAT 65. Therefore, segment summary information may be stored in second area 40. Specifically, second area 40 includes a plurality of segments S0 through Sn, and each of segments S0 through Sn is divided into a plurality of blocks. The segment summary information may be stored in at least one block SS0 through SSn of each of segments S0 through Sn.

The F2FS file system can also configure the storage area of storage device 20 as shown in FIG. 7D. As illustrated in FIG. 7D, as in FIG. 7C, first area 30 does not include SSA 66 (see FIG. 7A). That is, first area 30 includes super blocks 61 and 62, CP area 62, SIT 64, and NAT 65. Therefore, the segment summary information may be stored in second area 40. Second area 40 includes a plurality of segments S0 through Sn. Each of segments S0 through Sn is divided into a plurality of blocks BLK0 through BLKm, and blocks BLK0 through BLKm respectively include out of band (OOB) areas OOB1 through OOBm, where m is a natural number. The segment summary information may be stored in OOB areas OOB1 through OOBm.

Figure 9A:
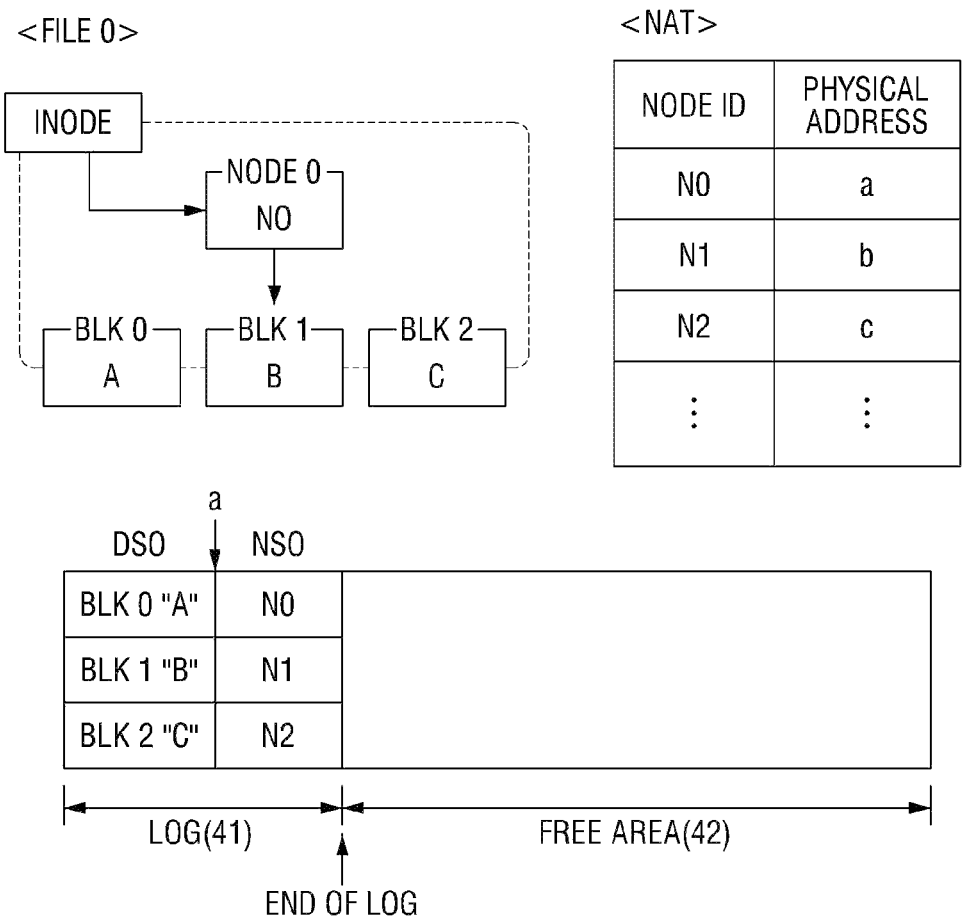
FIG. 9A is a conceptual diagram illustrating a process of updating data stored in the storage device of FIG. 1 according to an embodiment of the inventive concept.
Figure 9B:
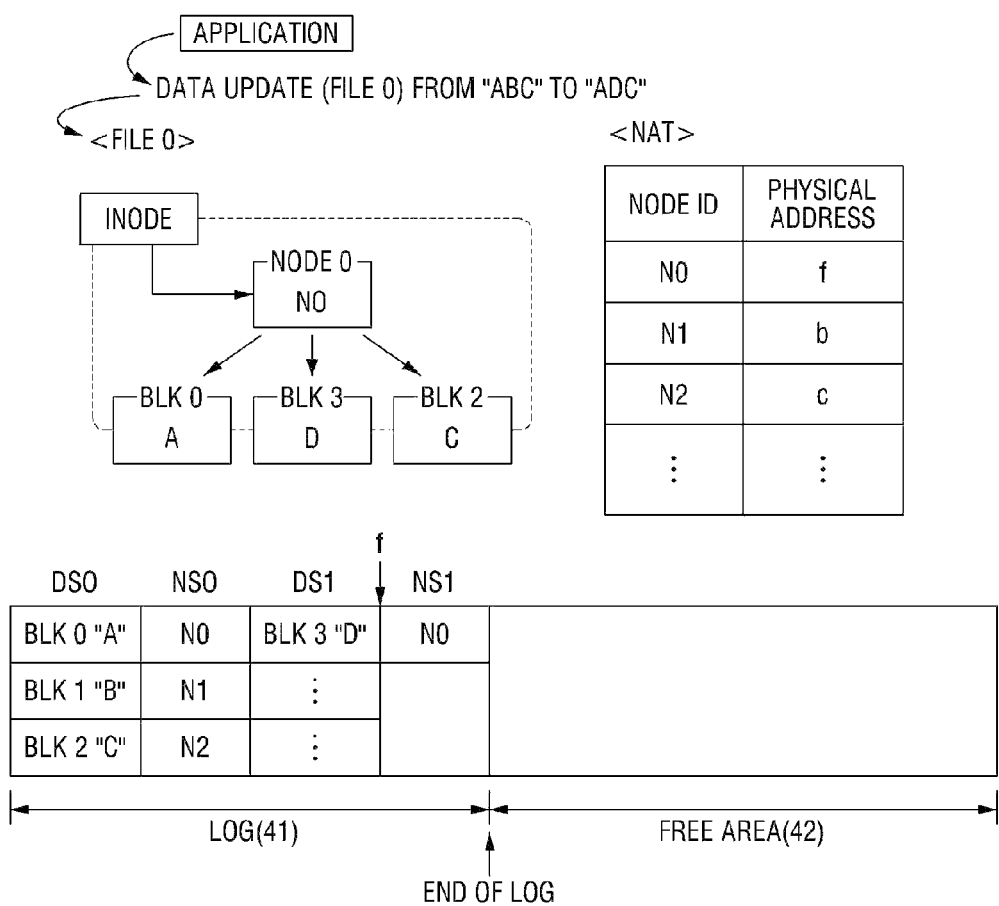
FIG. 9B is another conceptual diagram illustrating a process of updating data stored in the storage device of FIG. 1 according to an embodiment of the inventive concept.

FIGS. 9A and 9B are conceptual diagrams illustrating a data update operation of the F2FS file system according to an embodiment of the inventive concept. In particular, FIG. 9A illustrates data "ABC" stored in file 0 before being updated, and FIG. 9B illustrates data "ADC" stored in file 0 in response to a command from an application to update the data "ABC" to "ADC." The F2FS file system configures file 0 to include nodes and data blocks as shown in FIG. 6. For ease of description, it is assumed in FIGS. 9A and 9B that file 0 is configured such that an Mode indicates one direct node N0 and that direct node N0 indicates three data blocks.

Referring to FIG. 9A, a first data segment DS0 in log area 41 comprises first through third data blocks BLK 0 through BLK 2. It is assumed that first data block BLK 0 stores 'A,' that second data block BLK 1 stores "B," and that third data block BLK 2 stores "C." Unlike the illustration in FIG. 9A, first data segment DS0 can include more data blocks in addition to the first through third data blocks BLK 0 through BLK 2.

A first node segment NS0 in log area 41 comprises direct node block N0. Direct node block N0 may store at least a node ID (N0) and physical address information of the first through third data blocks BLK 0 through BLK 2. As shown in FIG. 9A, a physical address of direct node block N0 is "a."

Meanwhile, a NAT may store N0 which is the ID of the direct node block and "a" which is the physical address of N0.

File 0 having the updated data may be configured as shown in FIG. 9B.

Referring to FIG. 9B, because the application has instructed to update "ABC" of file 0 to "ADC," second data block BLK 1 storing "B" should be updated. However, the F2FS file system does not update "B" stored in second data block BLK 1 to "D." Rather, the F2FS file system stores a new fourth data block BLK 3, which stores "D," in a second data segment DS1 located at the end of log area 41. That is, updated file 0 consists of first data block BLK 0, fourth data block BLK 3, and third data block BLK 2. Accordingly, the physical address information of second data block BLK 1 in direct node block N0 should be updated to physical address information of fourth data block BLK 3. However, the F2FS file system does not update the existing physical address information of the child blocks of direct node block N0. Rather, the F2FS file system generates a new node block having the physical address information of first data block BLK 0, fourth data block BLK 3, and third data block BLK 2 as address information of its child blocks. Here, the new node block has the same node ID (i.e., N0) as direct node block N0. The new node block may be included in a second node segment NS1 located at the end of log area 41.

The physical address of node block N0 is changed from "a" to "f." According to a conventional log-structured file system, if the new node block is generated as described above, the physical address information of node block N0 in an indirect node which is a parent node of node block N0 should also be modified. In addition, because the indirect node will also be written to a new node block, a node block update operation may continuously propagate to the Mode as a parent node block. This is called a "wandering tree" problem. Because the wandering tree problem causes too many nodes to be newly written unnecessarily, it can reduce write efficiency achieved by sequential access write.

On the other hand, where a direct node block has to be newly written due to a data block update, the F2FS file system simply modifies a physical address (from "a" to "f") corresponding to the direct node in NAT 65. Thus, the node block update operation does not propagate to above the direct node. Consequently, the F2FS file system solves the wandering tree problem that occurs in the conventional log-structured file system.

FIGS. 10A through 10E are conceptual diagrams illustrating a segment cleaning process of the F2FS file system according to an embodiment of the inventive concept.

Figure 10A:
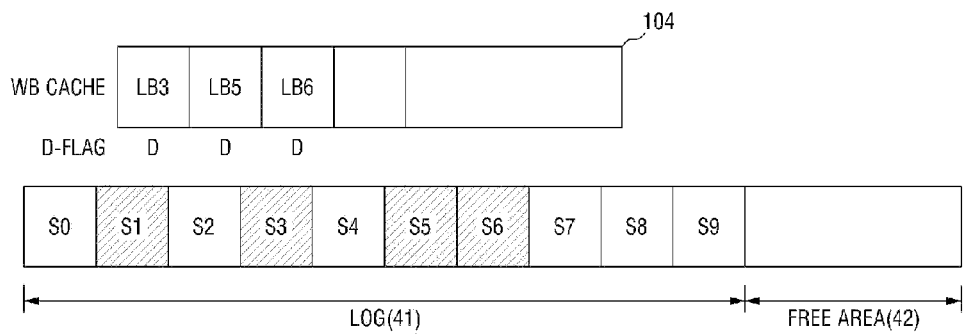
FIG. 10A is a conceptual diagram illustrating a process of performing segment cleaning on data stored in the storage device of FIG. 1 according to an embodiment of the inventive concept.

Referring to FIG. 10A, log area 41 comprises a plurality of segments S0 through S9. Because free area 42 is narrower than a predetermined width, a segment cleaning operation is initiated. First, victim segments are selected from segments S0 through S9 in log area 41. As mentioned earlier, the victim segments are segments to be returned to free area 42. The F2FS file system may select a segment which includes less than a predetermined proportion of live blocks or less than a predetermined number of live blocks as a victim segment. In the inventive concept, however, the method of selecting a victim segment is not limited to this method. In FIG. 10A, segments S1, S3, S5 and S6 are selected as victim segments.

In FIG. 10A, WB cache 104 is also illustrated. Live blocks LB3, LB5 and LB6 in segments S3, S5 and S6 are already stored in WB cache 104. In addition, a dirty bit corresponding to data stored in each entry of WB cache 104 is illustrated. When performing a flush operation, WB cache 104 writes back data stored in entries set with dirty bits to storage device 20.

Next, the F2FS file system determines whether live blocks in the victim segments are already stored in WB cache 104. The live blocks in each of the victim segments can be identified by referring to the bitmap in SIT 64. In addition, WB cache 104 manages a file ID of a file, to which each data block stored in each entry belongs, and offset information indicating the position of the data block in the file. Therefore, using file IDs and offset information of the live blocks, the F2FS file system can determine whether the live blocks are stored in WB cache 104 with memory managing module 15, which manages WB cache 104, or virtual file system 14. The F2FS file system may retrieve a parent node ID of each live block from SSA 66, obtain a physical address corresponding to the parent node ID from NAT 65, and obtain an ID of a file to which the live block belongs and offset information of the live block from a parent node block stored at the physical address.

Figure 10B:
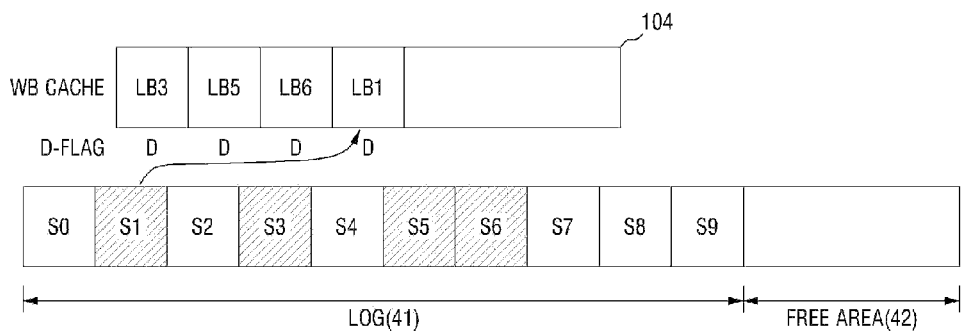
FIG. 10B is another conceptual diagram illustrating the process of performing segment cleaning on data stored in the storage device of FIG. 1 according to an embodiment of the inventive concept.

Referring to FIG. 10A, among live blocks in victim segments S1, S3, S5 and S6, live blocks LB3, LB5 and LB6 of segments S3, S5 and S6 are already stored in WB cache 104. However, a live block LB1 of segment S1 is not yet stored in WB cache 104. Therefore, the F2FS file system requests memory managing module 15, which manages WB cache 104, or virtual file system 14 to read LB1 from storage device 20 and load read LB1 to WB cache 104. This process is illustrated in FIG. 10B.

Next, the F2FS file system requests memory managing module 15, which manages WB cache 104, or virtual file system 14 to set dirty flags for the live blocks stored in advance or newly.

As mentioned above, WB cache 104 writes back all data stored in entries set with dirty flags to storage device 20 when performing a flush operation. Therefore, the time when the live blocks in the victim segments are stored in WB cache 104 may be somewhat different from the time when they are written back.

Figure 10C:
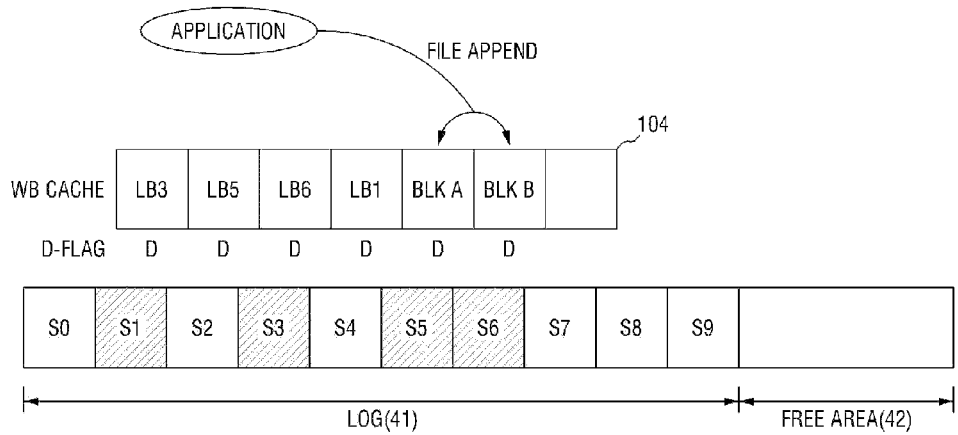
FIG. 10C is another conceptual diagram illustrating the process of performing segment cleaning on data stored in the storage device of FIG. 1 according to an embodiment of the inventive concept.

Referring to FIG. 10C, before the write-back operation, an application may issue a command to append data to the file. In this case, memory managing module 15, which manages WB cache 104, or virtual file system 14 may not directly append blocks BLK A and BLK B, which should be appended in response to the file append command, to storage device 20 but may input blocks BLK A and BLK B to WB cache 104. Because blocks BLK A and BLK B are not stored in WB cache 104, they are set with dirty bits. If the segment cleaning process is not of a background type which is performed periodically but of an on-demand type which is performed due to a lack of space in free area 42, the F2FS file system requests memory managing module 15, which manages WB cache 104, or virtual file system 14 to immediately perform a write-back operation, so that the victim segments can be immediately returned to free area 42.

Figure 10D:
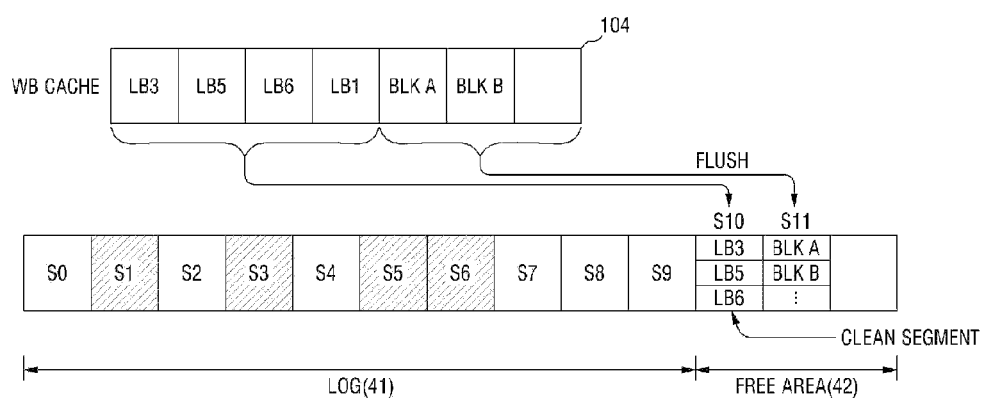
FIG. 10D is another conceptual diagram illustrating the process of performing segment cleaning on data stored in the storage device of FIG. 1 according to an embodiment of the inventive concept.

Referring to FIG. 10D, when it is time for WB cache 104 to perform a flush operation, memory managing module 15, which manages WB cache 104, or virtual file system 14 writes back data set with dirty bits to storage device 20 from among data stored in WB cache 104.

Memory managing module 15, which manages WB cache 104, or virtual file system 14 writes back a clean segment S10, which is composed only of the live blocks, and a segment S11, which includes blocks BLK A and BLK B that should be appended in response to the data append command, at the end of log area 41. Unlike the illustration in FIG. 10D, if more blocks can be in one segment, not only the live blocks but also blocks BLK A and BLK B may be in segment S10.

Memory managing module 15, which manages WB cache 104, or virtual file system 14 groups data to be written back according to file and writes back the data accordingly. Therefore, data in the same file can be written back adjacent to each other.

Comparing FIG. 10A with FIG. 10D, four victim segments were in log area 41 before the segment cleaning process. However, live blocks in the four victim segments were incorporated into one clean segment S10 as a result of the segment cleaning process. Therefore, three segments can be returned to free area 42.

Figure 10E:
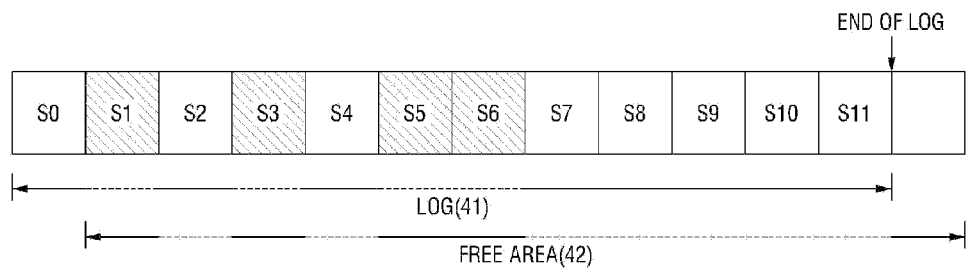
FIG. 10E is another conceptual diagram illustrating the process of performing segment cleaning on data stored in the storage device of FIG. 1 according to an embodiment of the inventive concept.

Log area 41 was one connected area before the segment cleaning process. However, the victim segments in log area 41 were returned to free area 42 as a result of the segment cleaning process. Thus, log area 41 consists of two or more separate areas as shown in FIG. 10E. In a state where log area 41 and free area 42 are configured as shown in FIG. 10E, if an additional segment should be recorded, it is recorded in free area 42 at the end of log area 41. Once the end of the storage area of storage device 20 is reached, free area 42 is searched for again from the beginning of second area 40. Because segments S1, S3, S5 and S6 were returned to free area 42, new data or node blocks can be written to segments S1, S3, S5 and S5 in a sequential access manner.

Specific systems to which a computing system according to some embodiments of the inventive concept can be applied will now be described. The systems described below are merely examples, and the inventive concept is not limited to these examples.

Figure 11:
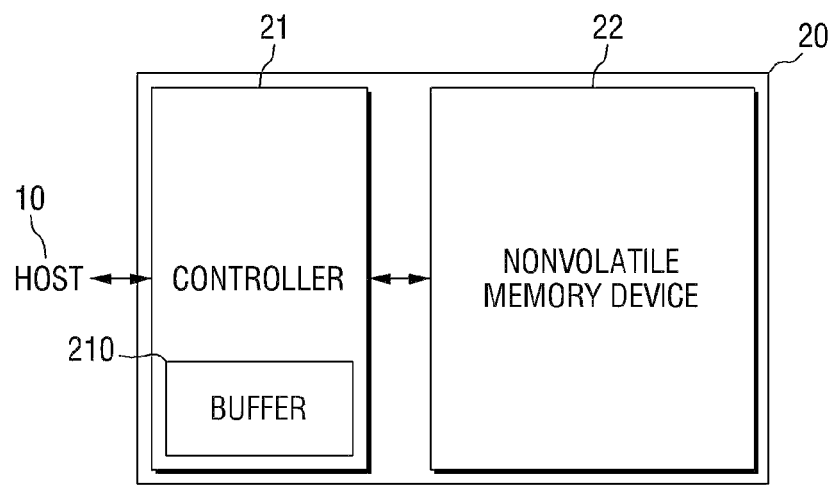
FIG. 11 is a block diagram of a computing system according to an embodiment of the inventive concept.
Figure 12:
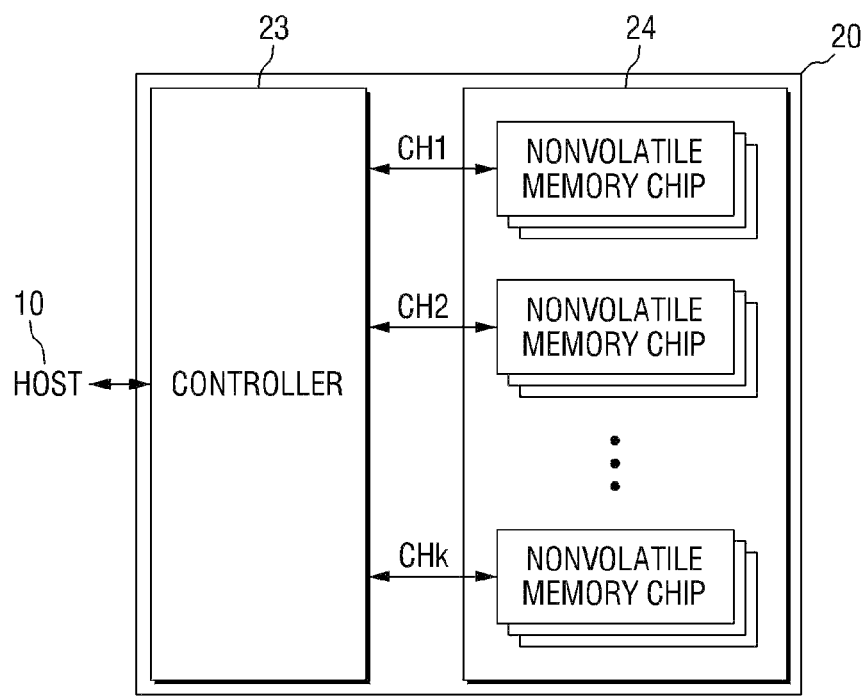
FIG. 12 is a block diagram of a computing system according to an embodiment of the inventive concept.
Figure 13:
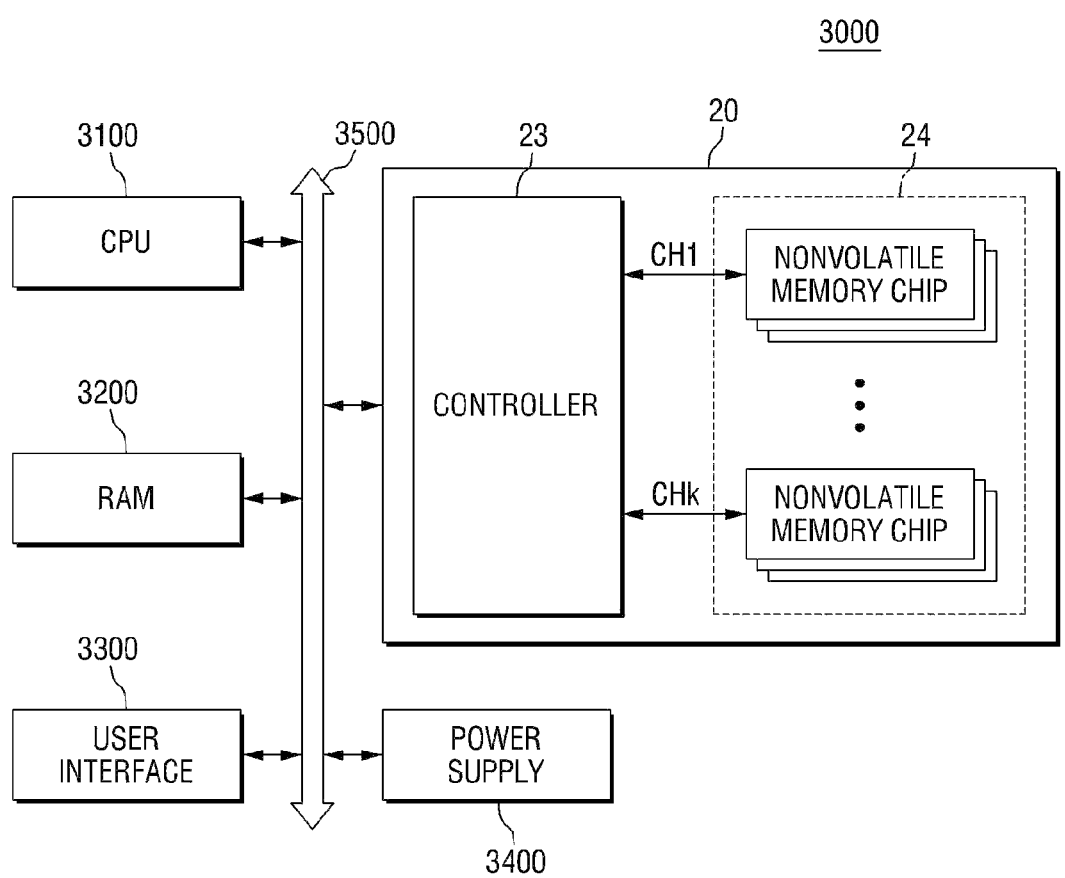
FIG. 13 is a block diagram of a computing system according to an embodiment of the inventive concept.

FIGS. 11 through 13 are block diagrams of various computing systems according to embodiments of the inventive concept.

Referring to FIG. 11, a storage device 20 comprises a nonvolatile memory device 22 and a controller 21. Super blocks 61 and 62, CP area 63, SIT 64, and NAT 65 described above may be stored in nonvolatile memory device 22.

Controller 21 is connected to a host 10 and nonvolatile memory device 22. Controller 21 is configured to access nonvolatile memory device 22 in response to a request from host 10. For example, controller 21 may be configured to control read, write, erase and background operations of nonvolatile memory device 22. Controller 21 is configured to provide an interface between nonvolatile memory device 22 and host 10. Controller 21 is configured to drive firmware for controlling nonvolatile memory device 22.

Controller 21 may further comprise well-known components such as a random access memory (RAM), a processing unit, a host interface, and a memory interface. The RAM can be used as at least one of an operation memory of the processing unit, a cache memory between nonvolatile memory deice 22 and host 10, and a buffer memory between nonvolatile memory device 22 and host 10. The processing unit controls the overall operation of controller 21.

Controller 21 comprises a buffer 210. Buffer 210 may be a RAM, in particular, a DRAM. Controller 21 and nonvolatile memory device 22 may be integrated into one semiconductor device. For instance, controller 21 and nonvolatile memory device 22 may be integrated into one semiconductor device to form a memory card. Similarly, controller 21 and nonvolatile memory device 22 can be integrated into one semiconductor device to form a personal computer (PC) card (e.g., Personal Computer Memory Card International Association (PCM-CIA)), a compact flash card (CF), a smart media card (SM, SMC), a memory stick, a multimedia card (e.g., MMC, RS-MMC, MMCmicro), a SD card (e.g., SD, miniSD, microSD, SDHC), or a universal flash storage (UFS).

Alternatively, controller 21 and nonvolatile memory device 22 may be integrated into one semiconductor device to form an SSD. Where the SSD is connected to host 10, the operation speed of host 10 may increase significantly.

Host 10 can be implemented in a computer, an ultra-mobile PC (UMPC), a workstation, a net-book, a personal digital assistant (PDA), a portable computer, a web tablet, a wireless phone, a mobile phone, a smart phone, an e-book, a portable multimedia player (PMP), a portable game device, a navigation device, a black box, a digital camera, a three-dimensional television, a digital audio recorder, a digital audio player, a digital picture recorder, a digital picture player, a digital video recorder, a digital video player, a device capable of transmitting/receiving information in wireless environments, one of various electronic devices constituting a home network, one of various electronic devices constituting a computer network, one of various electronic devices constituting a telematics network, a radio frequency identification (RFID) device, or one of various components constituting a computing system.

Nonvolatile memory device 22 or storage device 20 can be mounted using various forms of packages. nonvolatile memory device 22 or storage device 20 may be mounted using packages such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi chip package (MCP), wafer-level fabricated package (WFP), and wafer-level processed stack package (WSP).

Referring to FIG. 12, a storage device 20 comprises a nonvolatile memory device 24 and a controller 23. Nonvolatile memory device 24 comprises a plurality of nonvolatile memory chips. The nonvolatile memory chips form multiple memory chip groups. Each of the memory chip groups has one common channel for communication with controller 23. For example, the nonvolatile memory chips may communicate with controller 23 through first through $k^{th}$ channels CH1 through CHk.

In FIG. 12, a plurality of nonvolatile memory chips are connected to one channel. However, storage device 20 can be modified such that one nonvolatile memory chip is connected to one channel.

Referring to FIG. 13, a system 3000 comprises a central processing unit (CPU) 3100, a RAM 3200, a user interface 3300, a power supply 3400, and storage device 20 of FIG. 12.

Storage device 20 is electrically connected to CPU 3100, RAM 3200, user interface 3300, and power supply 3400 through a system bus 3500. Data provided through user interface 3300 or processed by CPU 3100 is stored in storage device 20.

In the example of FIG. 13, a nonvolatile memory device 24 is connected to system bus 3500 through a controller 23. However, nonvolatile memory device 24 can also be connected directly to system bus 3500.

Figure 14:
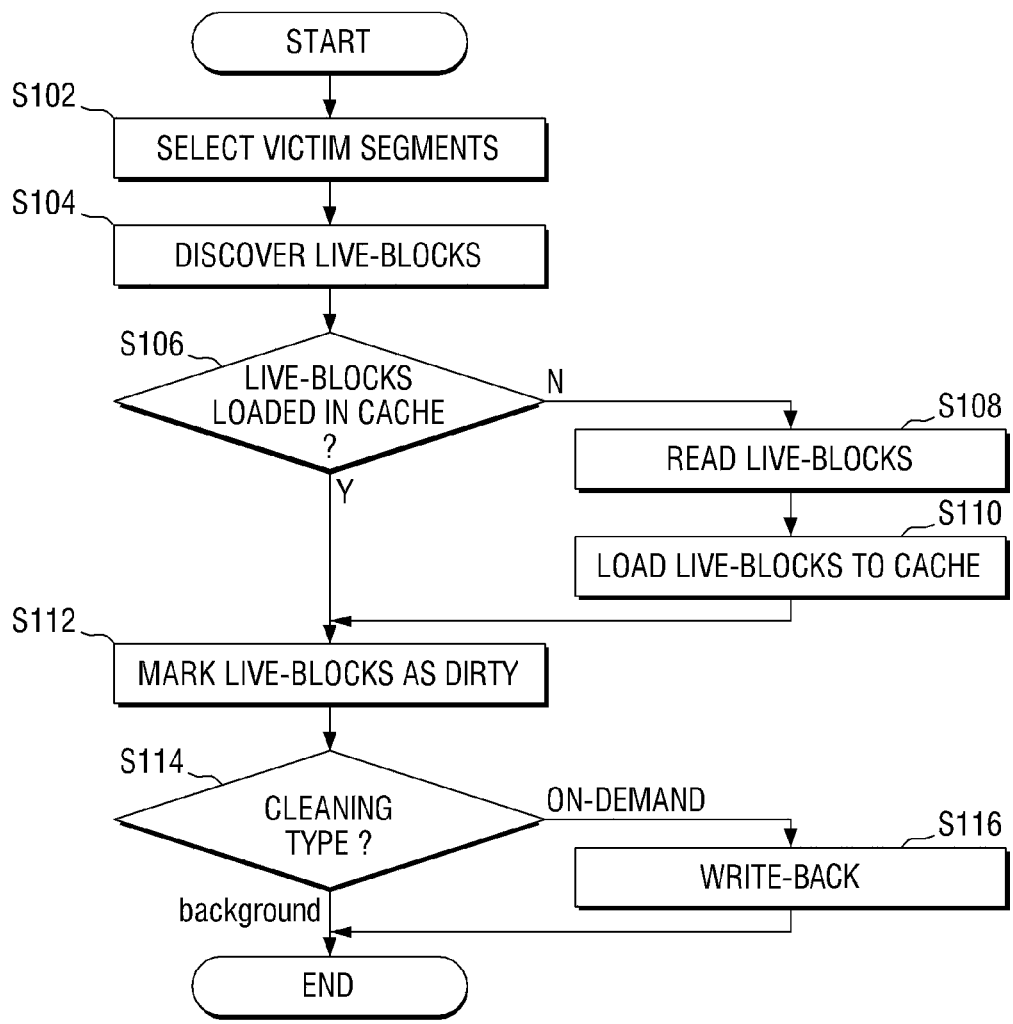
FIG. 14 is a flowchart illustrating a segment cleaning method according to an embodiment of the inventive concept.

FIG. 14 is a flowchart illustrating a segment cleaning method according to an embodiment of the inventive concept.

Referring to FIG. 14, victim segments to be returned to a free area are selected from a plurality of segments in a log area (S102). As described above, there are no specific restrictions on how the victim segments are selected. However, a victim segment comprising a small number of live blocks may be selected as a victim segment.

Live blocks storing valid data are identified among blocks included in the victim segments (S104). Whether a block is a live block can be determined by referring to bitmap data, which indicates whether each block is a live block, from among metadata stored in an area different from the log area.

Next, it is determined whether each of the discovered live blocks is already stored in a WB cache (S106). A file ID and offset information of each live block can be obtained from a parent node of the live block, and information about the parent node can be obtained from the metadata. Therefore, whether each live block is already stored in the WB cache can be determined using file ID and the offset information. Where the live blocks are not stored in the WB cache, they are read (S108), and the read live blocks are stored to the WB cache (S110).

A module that manages the WB cache is requested to set dirty bits for the live blocks stored in the WB cache (S112). As a result, when performing a flush operation, the WB cache writes back the stored live blocks at the end of the log area. That is, there is no need to perform a write-back operation for a segment cleaning process because the flush operation achieves the object of the write-back operation. Furthermore, the function of the WB cache itself allows blocks in the same file to be written back adjacent to each other.

By the nature of the WB cache, the time when the live blocks are stored may be different from the time when the live blocks are flushed. If the segment cleaning process is of a background type, such a time gap can be accepted. However, if the segment cleaning process is of an on-demand type which is performed due to a lack of space in the free area, waiting until the flush time can delay a write operation. Therefore, according to the current embodiment, when the segment cleaning process is of the on-demand type, the WB cache may be requested to immediately write back the live blocks (S116).

The foregoing is illustrative of embodiments and is not to be construed as limiting thereof. Although a few embodiments have been described, those skilled in the art will readily appreciate that many modifications are possible in the embodiments without departing from scope of the inventive concept as defined in the claims.

What is claimed is:

1. A host configured to interact with a storage device, the host comprising:
    a write-back (WB) cache configured to write data to the storage device;
    a cache managing module configured to manage the WB cache; and
    a file system module configured to determine during a segment cleaning operation whether live blocks in victim segments among a plurality of segments stored in the storage device are stored in the WB cache, to read the live blocks from the storage device as a consequence of determining that the live blocks are not stored in the WB cache, to load the read live blocks to the WB cache, and to request the cache managing module to set dirty flags for the stored live blocks.

2. The host of claim 1, wherein the cache managing module controls the file system module such that a clean segment comprising one or more live blocks stored in the WB cache is written back to the storage device.

3. The host of claim 2, wherein, during on-demand segment cleaning, the file system module requests the cache managing module to immediately write back the clean segment to the storage device responsive to a demand for segment cleaning due to lack of space in free areas of the storage device.

4. The host of claim 1, wherein the file system module divides the storage device into a first area which is written in a random access manner and a second area to which the plurality of segments are written in a sequential access manner, wherein metadata of data stored in the second area is stored in the first area.

5. The host of claim 4, wherein the file system module divides the second area into a log area in which the plurality of segments are stored and a free area in which segments can be stored, and the cache managing module controls the file system module such that a clean segment comprising one or more live blocks stored in the WB cache is written back to the free area located at the end of the log area.

6. The host of claim 5, wherein after the clean segment is written back, the file system module designates the victim segments as the free area.

7. The host of claim 4, wherein the file system module reads, from the first area, information about the live blocks among blocks in the victim segments.

8. The host of claim 4, wherein the file system module reads, for each of the live blocks, a file identifier (ID) of a file to which the live block belongs and a block offset indicating a position of the live block in the file from the first area and determines whether the live block is stored in the WB cache using the file ID and the block offset.

9. The host of claim 4, wherein the storage device is a solid state disk (SSD) comprising an internal buffer used for random access.

10. A segment cleaning method, comprising:
    determining at the start of segment cleaning whether live blocks in victim segments among a plurality of segments stored in a storage device are stored in a write-back (WB) cache of a host;
    as a consequence of determining that the live blocks are not stored in the WB cache, reading the live blocks from the storage device and storing the read live blocks to the WB cache; and
    requesting a module to manage the WB cache to set dirty flags for the stored live blocks in the WB cache.

11. The method of claim 10, further comprising writing back a clean segment comprising one or more live blocks stored in the WB cache, to the storage device.

12. The method of claim 11, wherein a file system module performs the determining whether the live blocks are stored in the WB cache, the storing of the read live blocks to the WB cache, and the requesting of the setting of the dirty flags,
    a memory managing module performs the writing back of the clean segment, and
    the WB cache is managed by the memory managing module.

13. The method of claim 11, wherein the writing back of the clean segment comprises:

writing back the clean segment to the storage device where the WB cache performs a flush operation during background segment cleaning, and immediately writing back the clean segment to the storage device during on-demand segment cleaning responsive to a demand for segment cleaning due to lack of space in free areas of the storage device.

14. The method of claim 11, wherein the writing back of the clean segment comprises configuring the clean segment such that live blocks in one file are stored physically adjacent to each other and writing back the clean segment to the storage device.

15. The method of claim 10, further comprising designating the victim segments as a free area so that data can be recorded in the victim segments.

16. A segment cleaning method, comprising:
by operation of a log-structured file system:
determining at the start of segment cleaning whether live blocks in victim segments among a plurality of segments in a storage device are stored in a write-back (WB) cache of a host;
selectively reading the live blocks from the storage device and storing the read live blocks in the WB cache based on whether the live blocks are stored in the WB cache; and
setting dirty flags for read live blocks that are stored in the WB cache responsive to said selectively reading.

17. The method of claim 16, further comprising writing back a clean segment comprising one or more live blocks stored in the WB cache, to the storage device.

18. The method of claim 17, wherein a file system module performs the determining whether the live blocks are stored in the WB cache, the storing of the live blocks to the WB cache, and the setting of the dirty flags,
a memory managing module performs the writing back of the clean segment, and
the WB cache is managed by the memory managing module.

19. The method of claim 17, wherein the writing back of the clean segment comprises:
writing back the clean segment to the storage device where the WB cache performs a flush operation during background segment cleaning, and
immediately writing back the clean segment to the storage device during on-demand segment cleaning responsive to a demand for segment cleaning due to lack of space in free areas of the storage device.

20. The method of claim 17, wherein the writing back of the clean segment comprises configuring the clean segment such that live blocks in one file are stored physically adjacent to each other and writing back the clean segment to the storage device.

* * * * *